(12) United States Patent
Hohri

(10) Patent No.: US 6,879,060 B2
(45) Date of Patent: Apr. 12, 2005

(54) METHOD AND APPARATUS FOR TRANSFER CONTROL AND UNDERVOLTAGE DETECTION IN AN AUTOMATIC TRANSFER SWITCH

(75) Inventor: Elliot Brooks Hohri, Foothill Ranch, CA (US)

(73) Assignee: Liebert Corporation, Columbus, OH (US)

( * ) Notice: Subject to any disclaimer, the term of this patent is extended or adjusted under 35 U.S.C. 154(b) by 418 days.

(21) Appl. No.: 10/067,139

(22) Filed: Oct. 22, 2001

(65) Prior Publication Data

US 2002/0130556 A1 Sep. 19, 2002

Related U.S. Application Data

(60) Provisional application No. 60/242,610, filed on Oct. 23, 2000.

(51) Int. Cl.⁷ .................................................. H02J 7/00
(52) U.S. Cl. .............................. 307/64; 307/29; 307/80; 307/85
(58) Field of Search ............................. 307/64, 80, 29, 307/85; 200/1 R, 50.01, 293

(56) References Cited

U.S. PATENT DOCUMENTS

| | | | |
|---|---|---|---|
| 4,152,634 A | 5/1979 | Penrod | 318/739 |
| 4,289,941 A | 9/1981 | Cannon | 200/146 R |
| 4,604,557 A | 8/1986 | Cowles | 318/98 |
| 4,811,163 A | 3/1989 | Fletcher | 361/8 |
| 5,041,775 A | 8/1991 | Erdman | 318/812 |
| 5,629,658 A | 5/1997 | Chen | 335/201 |
| 6,064,172 A | 5/2000 | Kuznetsov | 318/716 |

*Primary Examiner*—Brian Sircus
*Assistant Examiner*—Robert DeBeradinis
(74) *Attorney, Agent, or Firm*—Howrey Simon Arnold & White LLP

(57) ABSTRACT

An automatic transfer switch is disclosed that features a novel arrangement for detecting a failure of the power source as well as a novel arrangement for preventing cross-conduction between the first and second signal sources during a rapid transfer.

20 Claims, 14 Drawing Sheets

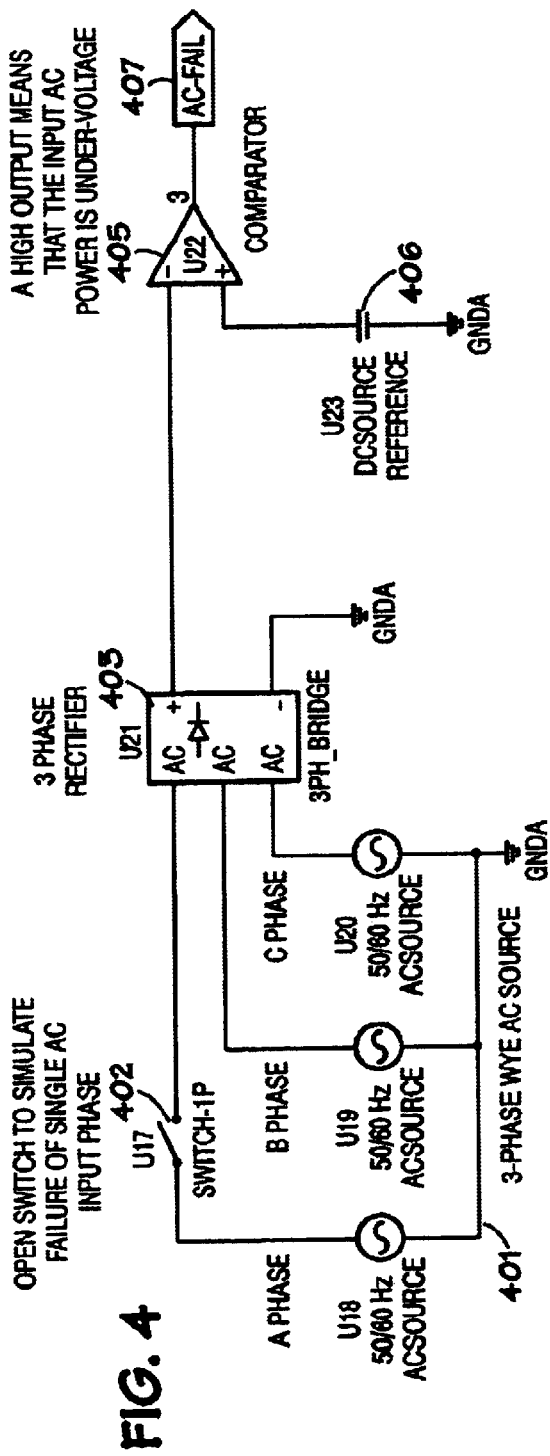
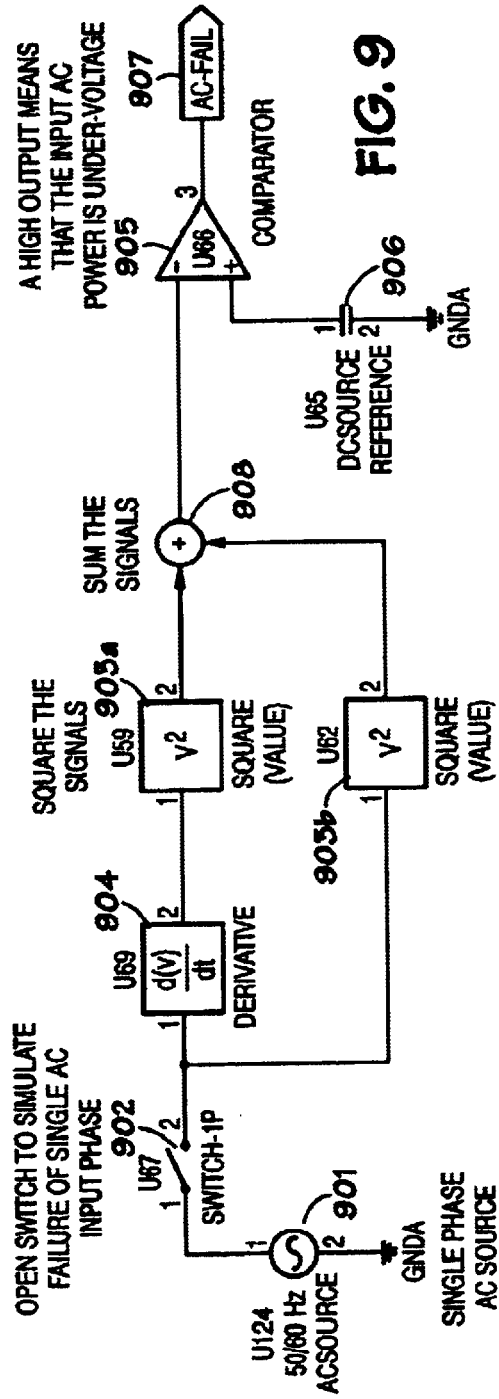
FIG. 4
FIG. 9

FIG. 10

METHOD AND APPARATUS FOR TRANSFER CONTROL AND UNDERVOLTAGE DETECTION IN AN AUTOMATIC TRANSFER SWITCH

CROSS-REFERENCE TO RELATED APPLICATIONS

This application claims the benefit of U.S. Provisional Patent Application Ser. No. 60/242,610, filed on Oct. 23, 2000 and having the title "Methods and Apparatus for Transfer Control and Undervoltage Detection in an Automatic Transfer Switch" and Elliot Hobri as inventor, which provisional application is hereby incorporated by reference in its entirety.

BACKGROUND OF THE INVENTION

The simplest mechanical automatic transfer switch comprises a single form C relay. It is desirable to have the relay switch quickly to minimize the power disruption to the load. However, rapid relay switching creates a possible shoot-through problem, i.e., an arc will form between the opening contacts, and if this arc is still conducting when the closing contacts close, a current path is created between the two input sources, shorting them together through the arc.

This problem was addressed in, for example, U.S. Pat. No. 4,811,163 which discloses the use of solid state snubbers in parallel with two mechanical form A or form B relays, with the relays used to accomplish the transfer. The arc is quenched by the solid state snubbers in parallel with the opening switch contact. Conversely, the present invention uses a relay in series with the contact for arc quenching rather than a parallel snubber. Furthermore the control circuit timing used in the present invention has significant advantages over the control circuit disclosed in the '163 Patent. The control circuit of the '163 Patent uses a pair of solid state switches to short the inputs together if one fails or is fired by noise or a failure of the drive circuit. This creates a potential backfeed problem, i.e., if one of the inputs is unplugged, a person touching the power pins on the end of the cord could be shocked by power coming from the other source. Furthermore, if both circuits are powered, a catastrophic short circuit would result. These safety problems render the system disclosed in the '163 Patent unacceptable under UL safety standard UL1950. Conversely, the system of the present invention meets these safety requirements.

An additional challenge facing designers and users of automatic transfer switches is detecting a failure of the primary source, so that a transfer to the secondary source can be initiated. A typical technique is to extract the level of the AC signal as a DC signal and compare it to a fixed DC reference. Most of the known techniques for detecting the level of an AC signal by converting it to a DC signal require long time constant filters to remove the AC component of the signal. Digital voltmeters, for example, use either a rectifier or an RMS to DC converter followed by a long time constant, low pass filter to smooth the ripple. These long time constant filters have long delays that are unacceptable in a transfer switch application, which must detect an AC signal failure in a quarter cycle or less.

One known technique to avoid this problem is to use a computer chip to compare the voltage in real time to an ideal sine wave reference signal calculated by the CPU. A transfer is initiated if the voltage deviates from the ideal sine wave by more than a predetermined amount. One shortcoming of this technique is that a dead band exists around the zero crossings of the voltage waveform. Because the source voltage is nearly zero during this portion of the cycle, it is difficult to differentiate between the normal waveform zero crossing and a source failure. One prior art solution to this problem has been to wait a sufficient time until it is known that the voltage is supposed to be higher. If he voltage has not risen, a failure has occurred. In addition to the undesirable delay, an additional disadvantage of this technique is that it requires a CPU, with the associated complexity, noise and reliability problems.

Conversely, the automatic transfer switch of the present invention solves this problem by tracking the slope of the AC signal in addition to its magnitude. Because the slope of a sine wave is highest at the zero crossings, the slope signal is strongest at exactly the same point where the magnitude signal is weakest. Therefore, adding the magnitude and slope creates a signal that reliably and quickly indicates a voltage source failure at all points along the waveform.

SUMMARY OF THE INVENTION

One feature of the present invention is a relay sequencing scheme that prevents undesirable cross-conduction between the two input AC sources of an automatic transfer switch. Cross-conduction is caused by contact arcing that starts when the relays of one source are opened and continues after the relays of a second source are closed. The present invention solves this problem by placing an extra set of relays in series with an upstream of the main transfer relay. The extra relays independently control switching of the inputs. Because the inputs are switched independently, a time delay may be introduced between the opening of the first set of contacts and the closing the other set, thereby allowing sufficient time for the arcing to stop and preventing the undesirable cross-conduction between the two sources.

Another feature of the present invention is a fast detection technique for sensing an under voltage condition in an AC signal and, more generally, for extracting the envelope of an AC signal. The technique involves adding the signal with a phase shifted version of itself, converting the summed signal to a DC level through a non-linear process, e.g. rectifying or squaring, and then comparing the DC level to a fixed threshold.

BRIEF DESCRIPTION OF THE DRAWINGS

FIG. 3 illustrates a three phase rectified delta source failure detection circuit, known in the prior art.

FIG. 4 illustrates a three phase rectified wye source failure detection circuit, known in the prior art.

FIG. 9 is a single phase squared then summed quadrature source failure detection circuit in accordance with the present invention.

FIG. 10 is a three phase quadrature per phase source failure detection circuit in accordance with the present invention.

DESCRIPTION OF ILLUSTRATIVE EMBODIMENTS

Figure 1:
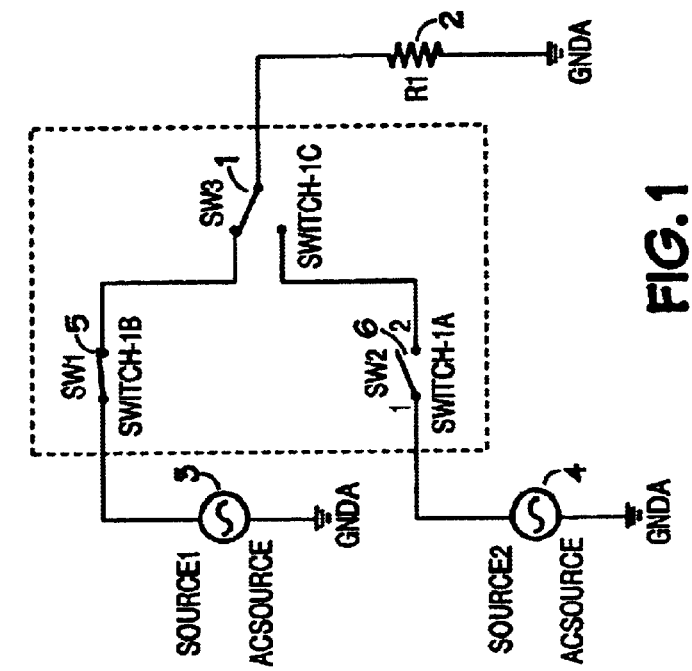
FIG. 1 is an elementary diagram of an automatic transfer switch in accordance with the present invention.

An automatic transfer switch in accordance with the present invention is illustrated in FIG. 1. Automatic transfer switch 7 connects first alternating current ("AC") voltage source 3 and second AC voltage source 4 to load 2. For purposes of the following discussion, first AC voltage source 3 will be referred to as the primary source and AC voltage source 4 will be referred to as the secondary source. Under normal conditions, i.e., when primary source 3 is available, transfer switch 7 will connect primary source 3 to load 2. If primary source 3 fails, transfer switch 7 will automatically and rapidly connect second source 4 to load 2 to prevent disruption of power to load 2.

Automatic transfer switch 7 comprises switch 1, illustrated as a form C relay, as the primary transfer element. To minimize power disruption to the load, it is desirable that switch 1 switch as rapidly as possible upon failure of the normal source. However, rapid switching of switch 1 creates a potential shoot through, i.e., cross-conduction, problem. Because of inductance in the system, when switch 1 opens the connection between source 3 and load 2, an arc may strike between the switch contacts. If this arcing is still present when the switch 1 closes connecting the standby source 4 to load 2, undesirable cross-conduction between the two sources will result.

According to the present invention, a solution to this cross-conduction problem is to use a form A (or form B) relay in series with each source. Turning again to FIG. 1, switch 5 is series connected between primary source 3 and switch 1. Similarly, switch 6 is series connected between secondary source 4 and switch 1. Upon failure of normal source 3, switch 5 is opened at the same time form C switch 1 is changing states. After switch 1 has changed states, switch 6 closes thereby completing the circuit from secondary source 4 to load 2. A delay is interposed before closing switch 6 to guarantee that a voltage zero crossing occurs between the opening of switch 5 and the closing of switch 6. This zero crossing insures any arc across switch 1 will die out before secondary source 4 is connected.

There are multiple alternatives for determining the delay to be interposed before closing switch 6. One approach is to use a fixed time delay equal to one-half cycle of the AC input voltage. A one-half cycle delay guarantees that there will be a zero crossing during the delay interval. The arcing will stop no later than the zero crossing and, thus, will have stopped before relay 6 closes.

Another approach to determining the delay before switch 6 may be closed is to sense the arc and close switch 6 as soon the arcing stops. This can be done in one of three ways. The first is to monitor the current through switch 1 and close after a zero crossing. A second way is to monitor the voltage across switch 1 and close after a zero crossing. A third method is to monitor the voltage across switch 1 and close after a high voltage is detected. Of the latter alternatives, it is preferable switch after a voltage zero crossing because the arc will be quenched at the zero crossing. Conversely, a high voltage will not be detectable until some fraction of a cycle after the zero crossing.

Still another alternative technique for determining when switch 6 may be closed is to use a combination of the two methods discussed above, i.e., sensing the arc but transferring after one-half cycle even if a "no arc" reading has not been detected.

Figure 2:
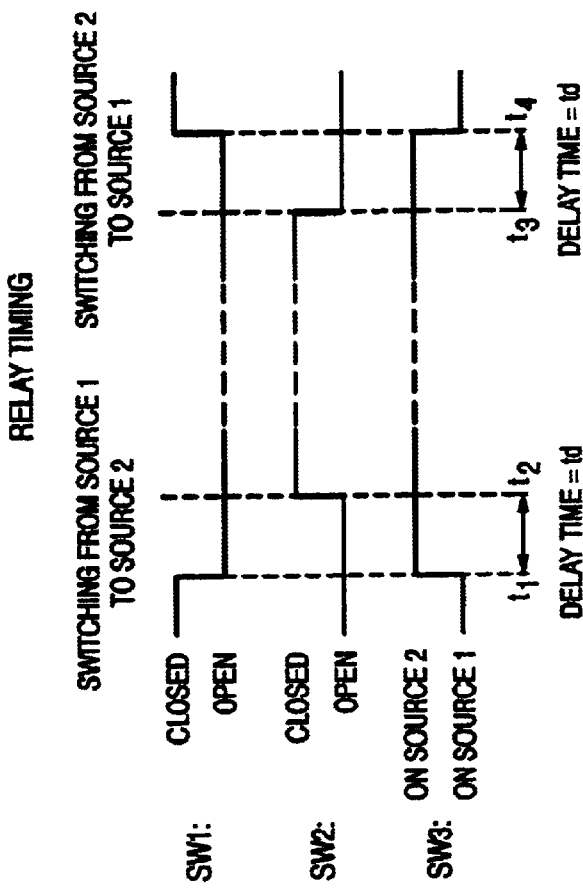
FIG. 2 is a timing diagram illustrating the switch timing of an automatic transfer switch in accordance with the present invention.

A timing diagram illustrating switching of transfer switch 7 is given in FIG. 2. At a first time $t_1$, the switch from primary source 3 to secondary source 4 begins. At time $t_1$, transfer switch 1 switches from primary source 3 to secondary source 4. At the same time, relay 5 is opened to prevent arcing across transfer switch 1. After a delay time $t_d$ that extends from $t_d$ to $t_2$, switch 6 is closed connecting secondary source 4 to load. FIG. 2 also illustrates a retransfer to the primary source, beginning at time $t_3$. First, Switch 1 transfer from secondary source 4 to primary source 3. Simultaneously, switch 6 is opened to prevent arcing across switch 1. After a delay time $t_d$, which ends time $t_4$, switch 5 is closed reconnecting to load 2 to primary source 3.

Figures 3, 3A, 3B:
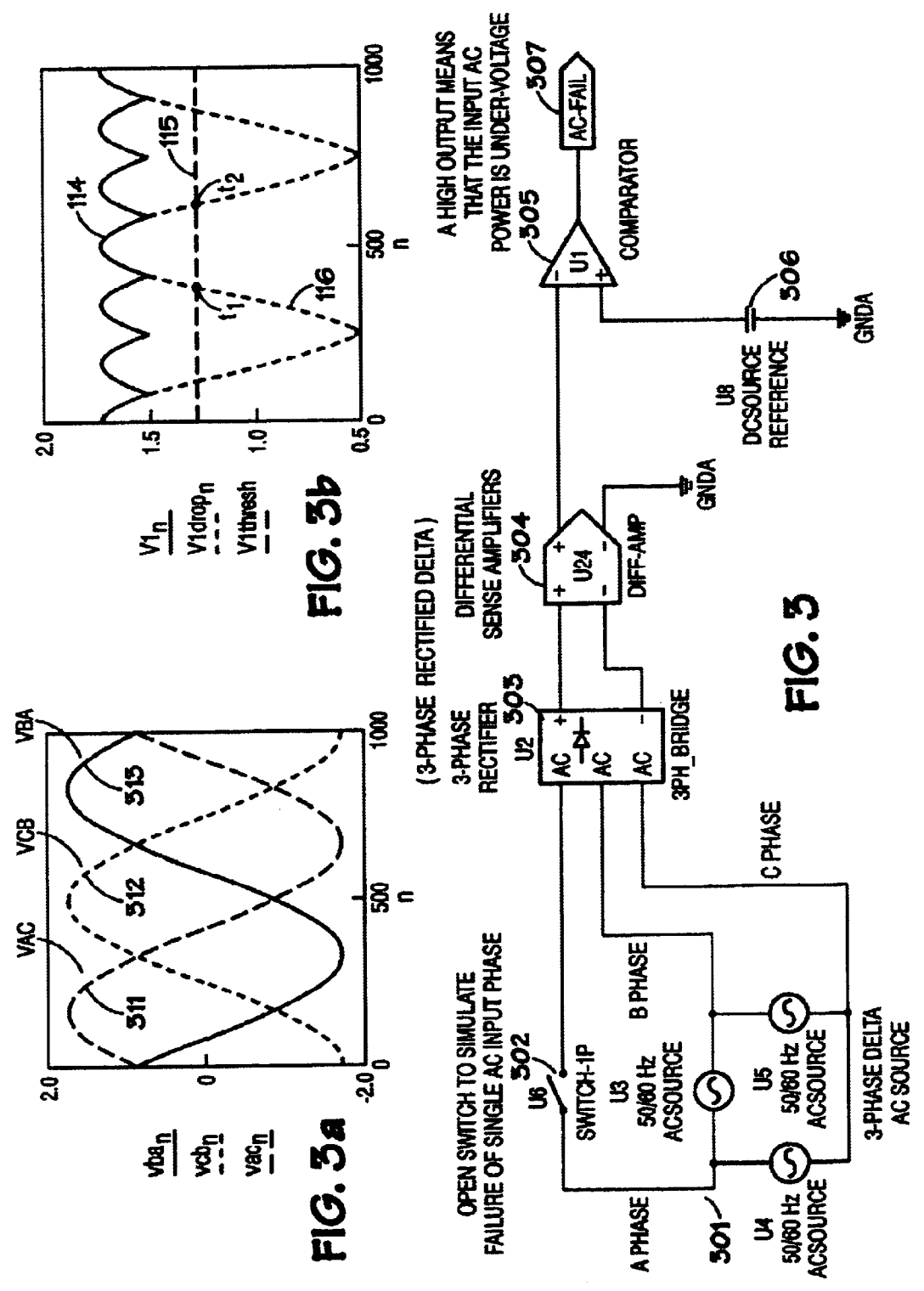

Another problem of existing automatic transfer switches is that of rapidly detecting a source failure so that a secondary source may be connected quickly, minimizing load disruption. Various circuits and techniques are known for detecting a source failure of using the source voltage waveform. One such circuit is illustrated in FIG. 3a. The circuit detects a failure of delta connected three phase voltage source 301. FIG. 3b shows the line to line voltages produced by source 301: $V_{AC}$ 311, $V_{CB}$ 312 and $V_{BA}$ (313).

Source 301 is connected to the input of three phase bridge rectifier 303. The output of rectifier 303 is connected to the input of differential amplifier 304, which converts the rectified sinusoidal produced by rectifier 303 to a DC voltage signal that is referenced to ground. If source 301 is operating normally, the output of differential amplifier 304 will be rectified sinusoid 314. The rectified sinusoid 314 is input to comparator 305, which compares the rectified sinusoid to DC reference source 306. The voltage of reference source 306 is the threshold voltage for failure detection. The detection threshold is chosen as 85% of the minimum value of rectified sinusoid 314. If the instantaneous output voltage of differential amplifier 304 drops below voltage of reference source 306, i.e., voltage level 315, then the output 307 of comparator 305 will go to a logic high signal indicating a failure of source 301.

The detection circuit illustrated in FIG. 3 also includes switch 302 connected in one phase of the circuit between source 301 and rectifier 303. Opening switch 302, simulates a single phase failure of source 301. A single phase failure of source 301 changes the output of differential amplifier 304 from rectified sinusoid 314 to pure sinusoid 316. Comparator 305 will transition to a logical high output when the instantaneous voltage of signal 316 drops below the DC detection threshold 315.

To determine the maximum time between failure of source 301 and detection of the failure by a transition on output 307, it is necessary to determine the maximum time required for the instantaneous voltage of differential amplifier 304 output signal 316 to drop below the voltage of reference 306, i.e., detection threshold 315. The longest detection time will result if the failure occurs when voltage waveform 316 has just passed above detection threshold 315, identified as to in FIG. 3c. The failure of source 301 will be detected at time $t_2$ when signal 116 again drops below detection threshold 315. The elapsed time between $t_1$ and $t_2$, which is the maximum detection time, is 0.237 cycles of the source AC waveform. For a 60 Hz system, this time is approximately 3.95 milliseconds. For a 50 Hz system, the time is 4.74 milliseconds.

The detection circuit of FIG. 3 may be adapted for use with a wye connected source as illustrated in FIG. 4. The circuit comprises wye-connected, three phase source 401, connected to the input of three phase rectifier 403. The output of rectifier 403 is connected to the input of comparator 405, which compares the rectifier output signal to DC reference source 406. Operation of this circuit is basically the same as the circuit discussed above. The maximum time required to detect a source failure is also the same, i.e., 0.237 cycles of the AC waveform.

Figure 5A:
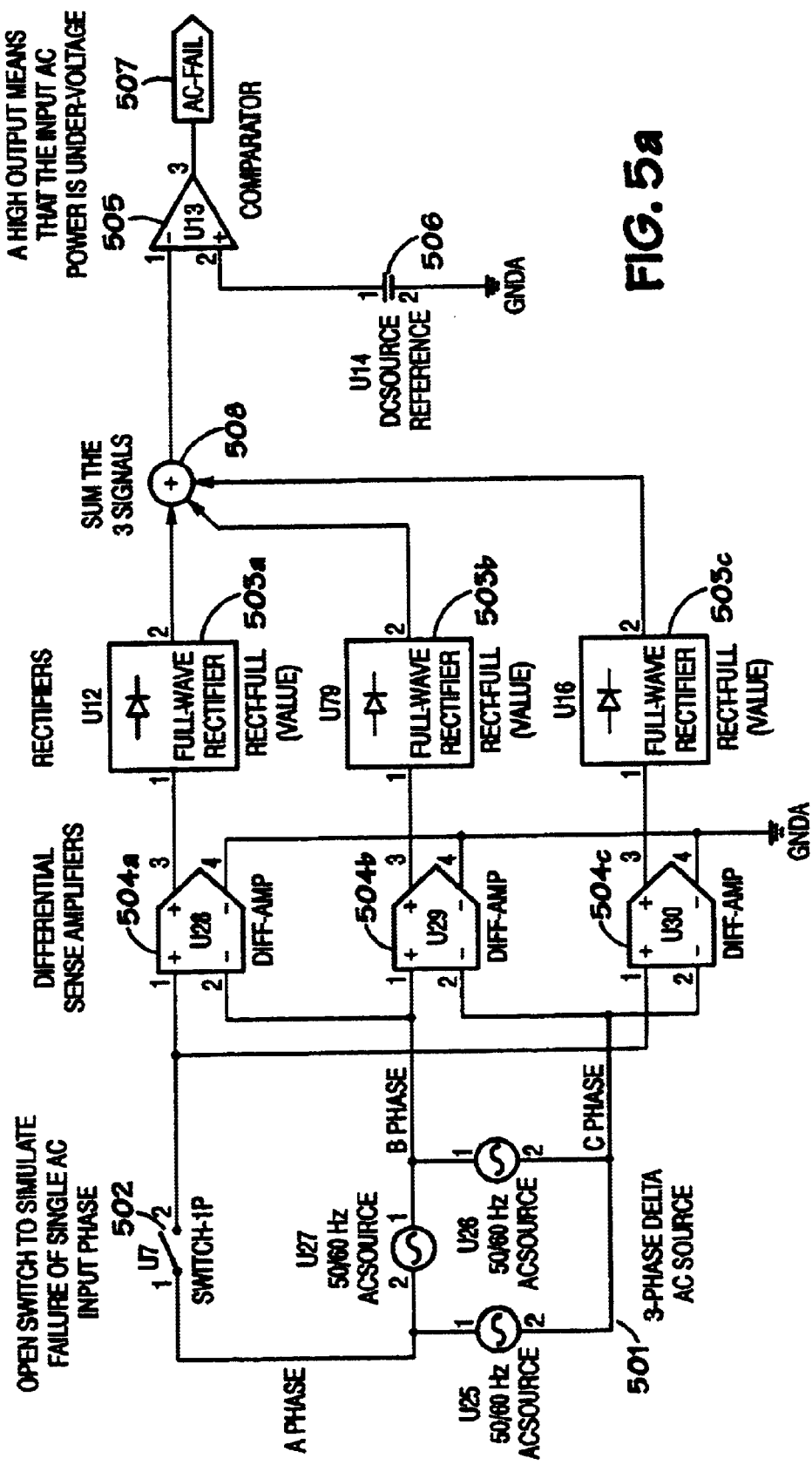
FIG. 5 illustrates a three phase rectified then summed delta source failure detection circuit.
Figure 5B:
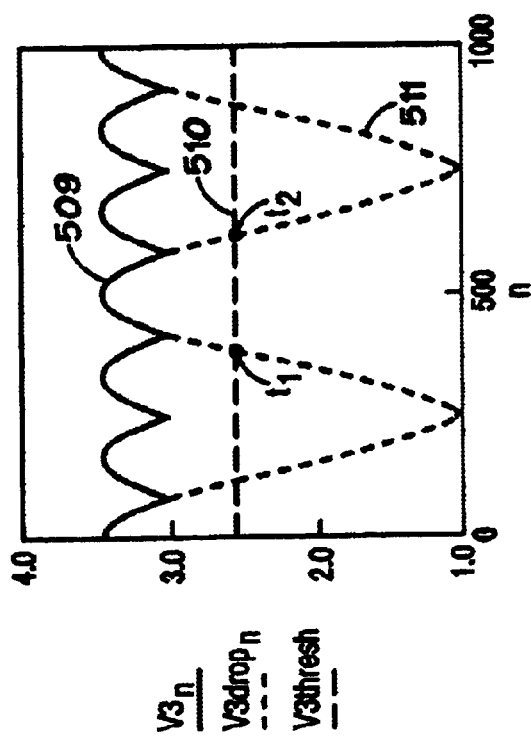

A variation on the detection circuits described above is illustrated in FIG. 5a. Each phase of three phase delta connected source 501 is connected to a differential amplifier 504 to isolate the individual phase voltages. The isolated phase voltage are G1 rectified by full wave rectifiers 503. The three rectifier output waveforms are added together by summing amplifier 508. The output of summing amplifier 508 is connected to a first input of comparator 505. Voltage signal 509, shown in FIG. 5b, is the output of summing amplifier 508 when source 501 is operating normally.

A second input of comparator 505 is DC reference 506. Voltage signal 510 is the voltage of DC reference 506 and is also the source failure detection threshold. The failure detection threshold is chosen as 85% of the minimum value of detection waveform 509. If one phase of source 501 fails, the output of summing amplifier 508 becomes voltage waveform 311. The source failure will be detected when waveform 311 drops below detection threshold 510, causing output 507 of comparator 505 to transition to a logic high value.

The maximum detection time is required when the failure occurs just after signal 511 rises above detection threshold 510, shown at time $t_1$. The failure will not be detected until signal 311 falls below threshold level 510, which occurs at time $t_2$. The elapsed time between $t_1$ and $t_2$ is 0.237 cycles of the AC voltage waveform, the same detection time required by the circuits described above.

Figure 6B:
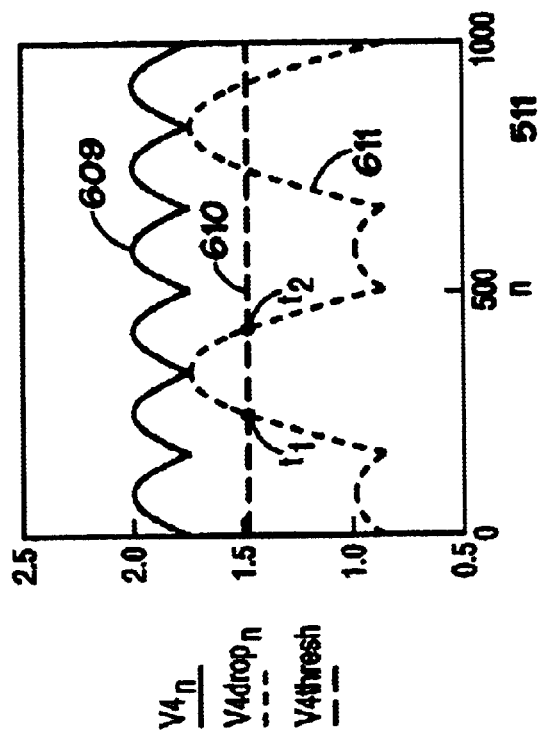
FIG. 6 illustrates a three phase rectified then summed wye source failure detection circuit.
Figure 6A:
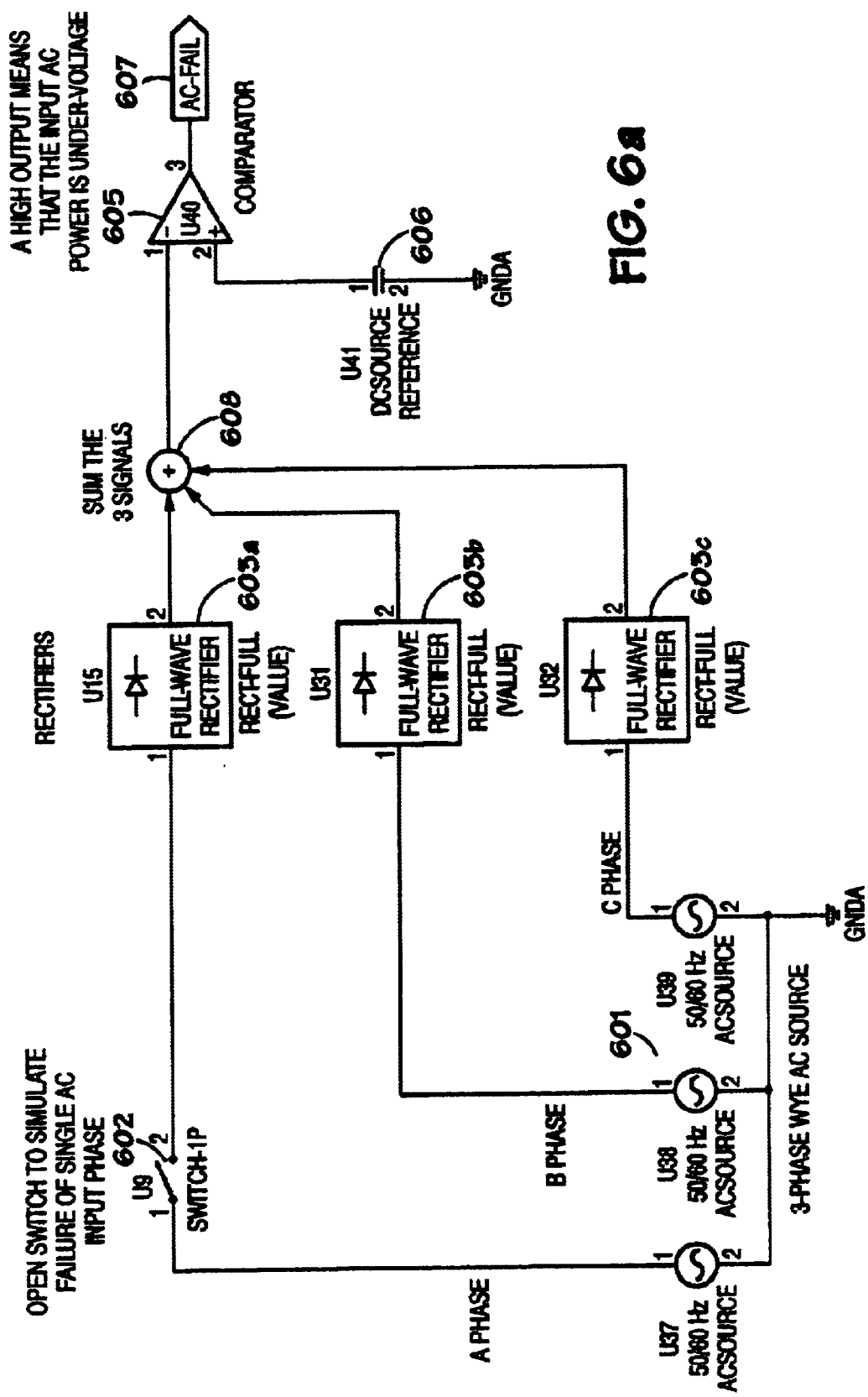

The detection circuit of FIG. 5 may be adapted for use with a wye connected source, as shown in FIG. 6. Each phase of source 601 is connected to the input of one of full wave rectifiers 603. The outputs of rectifiers 603 are connected to the input of summing amplifier 608. Voltage signal 609, shown in FIG. 6B, is the output of summing amplifier 608 when all phases of source 601 are operating normally.

The output of summing amplifier 608 is connected to an input comparator 605. Comparator 605 compares the output of summing amplifier 608 to reference voltage 606. Voltage signal 610 is the DC voltage of reference source 606 and is the source failure detection threshold. If a failure has not occurred, the output voltage of summing amplifier 408 is greater than the voltage of DC reference 606, and comparator 405 generates a logic low signal at output 607. If source 601 fails, the output voltage of summing amplifier 608 becomes signal 611, shown in FIG. 6b. When signal 611 drops below the detection threshold 610, comparator 605 will generate a logic high signal at output 607.

The maximum time required to detect a failure will occur if the failure occurs at the point where signal 611 rises above detection threshold 610, shown at $t_1$. The failure will not be detected until the signal drops below detection threshold 610, which occurs at $t_2$. The elapsed time between points $t_1$ and $t_2$ is 0.176 cycles, which corresponds to 2.93 milliseconds for a 60 Hz system or 3.52 milliseconds for a 50 Hz system. Although the circuit of FIG. 6 exhibits slightly faster detection circuits than the circuits discussed above, this circuit may be used only if a neutral connection is available.

Figure 7A:
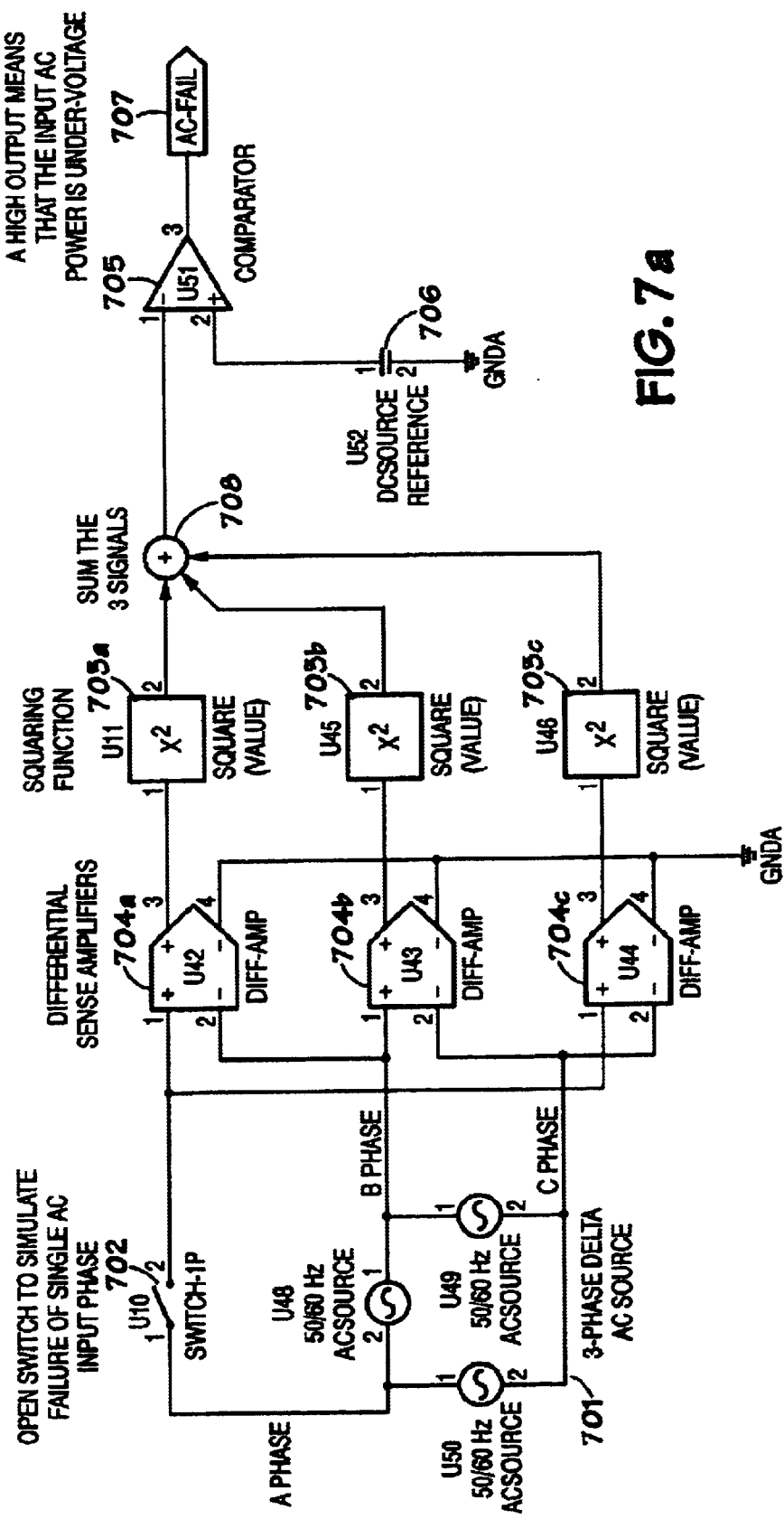
FIG. 7 illustrates a three phase squared then summed delta source failure detection circuit, in accordance with the present invention.
Figure 7B:
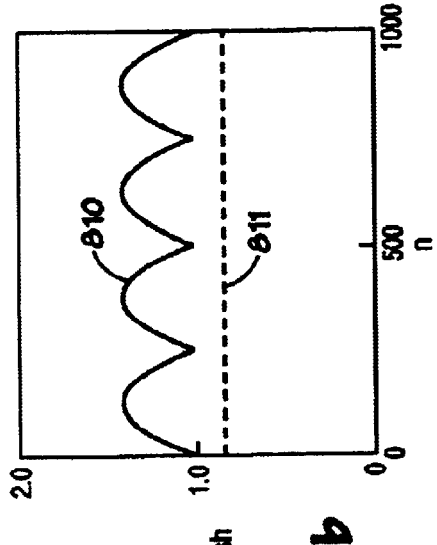

Another detection circuit is illustrated in FIG. 7. The circuit of FIG. 7 is suitable for use with a three phase, delta connected source. The detection circuit comprises differential amplifiers 704, squaring circuits 703, summing amplifier 708, DC reference source 706, and comparator 705. Each phase of source 701 connected to an input of one of differential amplifiers 704 to isolate the individual phase voltages. The outputs of differential amplifiers 704 are connected to the inputs of squaring circuits 703. The outputs of the squaring circuits are connected to the inputs of summing amplifier 708, which adds the three voltages. Signal 709 shown in FIG. 7b is the normal output signal for summing amplifier 708. Signal 711 is the output of summing amplifier 708 when one phase of source 701 has failed, which can be simulated by opening switch 702.

The output of summing amplifier 708 is connected to a first input of comparator 705. The second input of comparator 705 is connected to DC reference 706. Detection threshold 710, shown in FIG. 7b, is the voltage of DC reference 706. As in the other examples, the detection threshold is selected as 85% of the normal detection waveform. If the instantaneous output voltage of summing amplifier 708 output signal is less than the voltage of DC reference 706, the output 707 of comparator 705 will be a logical high value, indicating a failure of voltage source 701.

The maximum failure detection time will result when the failure occurs immediately after summing amplifier 708 output signal 711 has risen above detection threshold 710, which occurs at $t_1$. The failure will not be detected until signal 711 drops below threshold 710 at time $t_2$. The elapsed time between $t_1$ and $t_2$ is 0.189 cycles of the AC waveform, which corresponds to 3.15 milliseconds for a 60 Hz system or 3.78 milliseconds for a 50 Hz system. This detection time is slightly faster than the methods discussed above. An additional advantage of this circuit is that it produces a DC signal representing the squared envelope of the waveform in real time.

Figure 8B:
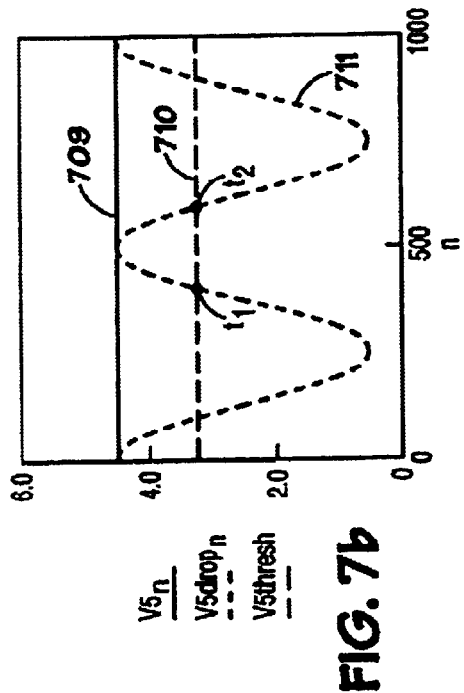
FIG. 8 is a single phase rectified then summed quadrature source failure detection circuit in accordance with the present invention.
Figure 8A:
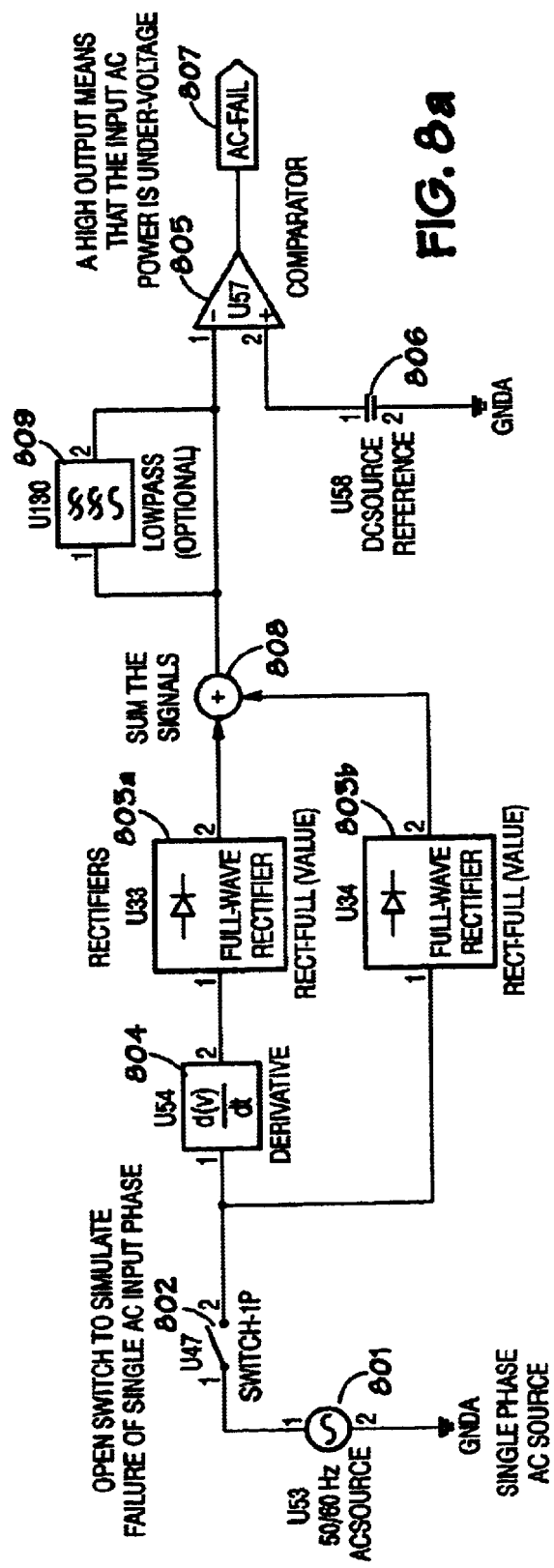

The novel detection circuit illustrated in FIG. 8a derives a phase shifted (quadrature) signal using a differentiator (slope) circuit. By including the quadrature signal in the detection circuit, a fault detection time of zero is theoretically possible at all phase angles. However, the differentiation function is inherently noise sensitive. Therefore, in practice it is frequently necessary to follow the differentiator circuit with a low pass filter, which introduces some slight detection delay.

The circuit of FIG. 8 comprises single phase AC source 801, differentiator 804, full wave rectifiers 803, summing amplifier 808, comparator 805, DC reference 806 and an optional low pass filter 809. Summing amplifier 808 adds a full-wave rectified version of the output waveform of source 801 to a full-wave rectified version of the derivative of the voltage of source 801. The output of summing amplifier 808 may be passed through optional low pass filter 809.

AC waveform 810 is the output of the summing amplifier 808, which is a first input signal for comparator 805. The second input to comparator 805 is reference source 806. Failure detection threshold 811 is the voltage of DC reference 806. If the instantaneous output voltage of summing amplifier 808 is less than the voltage of DC reference 806, comparator 805 generates a logic high signal at output 807 to indicate a source failure.

The inherent detection delay time of this circuit is zero. If source 801 fails, the sense voltage 810 goes to zero immediately because the input signal and its derivative are zero. The detection delay is also independent of phase angle. As noted above, however, the circuit of FIG. 8 is noise sensitive. Therefore, low pass filtering is generally beneficial, although the filtering does slightly slow detection times from the ideal case.

Another novel detection circuit is illustrated in FIG. 9. This circuit is similar to the circuit of FIG. 8, except that the direct and quadrature signals are converted to DC by squaring instead of rectification. As opposed to rectification, squaring the voltage signals theoretically produces a pure DC voltage with no AC ripple. The circuit of FIG. 9 produces an instantaneous DC voltage corresponding to the square of the AC signal envelope. The circuit of FIG. 9 does have the noise disadvantage described above, although low pass filters may be added to reduce the noise sensitivity. As with the circuit of FIG. 8, the inherent detection delay time for this circuit is zero.

The circuit of FIG. 9 comprises AC voltage source 901, differentiator circuit 904, squaring circuits 903, summing amplifier 908, DC reference source 906 and comparator 905. The circuit operates by adding the square of the voltage waveform produced by source 901 to the square of the derivative of the voltage waveform produced by source 901. This summed signal is then compared to a DC reference value, and a failure of source 901 is indicated by the output 907 of comparator 905 generating a logical high signal, caused when the summed squared waveforms fall below the DC reference value.

If the voltage waveform goes to zero, the sense voltage also immediately goes to zero, independent of phase angle. An additional novel feature of this detection circuit is that it generates an instantaneous DC voltage that is equal to the envelope of the sine wave.

Figure 10:
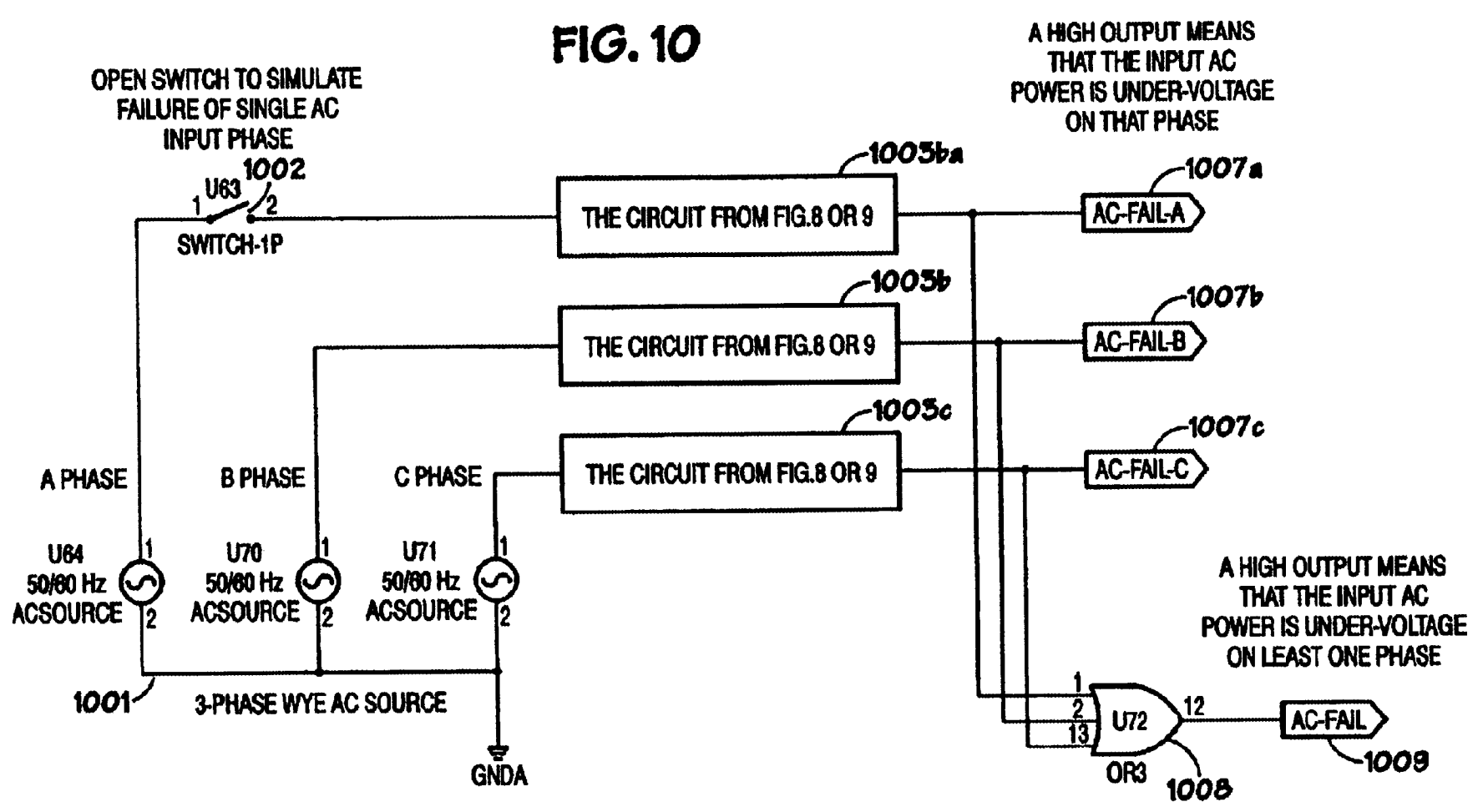

The circuit of FIG. 10 extends the circuits of FIG. 8 or 9 to a three phase, wye connected system. The circuit comprises three phase, wye connected source 1001 and includes three copies of the circuit disclosed in FIG. 8 or 9, one copy for each phase. The technique described in conjunction with FIG. 8 or 9 is applied independently to each phase of the three phase circuit. The results are, therefore, the same as described above. The failure detection outputs for each phase are logically "OR'd" together. The circuit thus produces a failure signal if any one or more of the individual phases fails.

The circuits described below compromise between the noise sensitivity of the quadrature circuits of FIGS. 8, 9 and 10 with the slower detection times of the rectification circuits. These circuits operate by adjusting the ratio of the direct and quadrature signals.

Figure 11A:
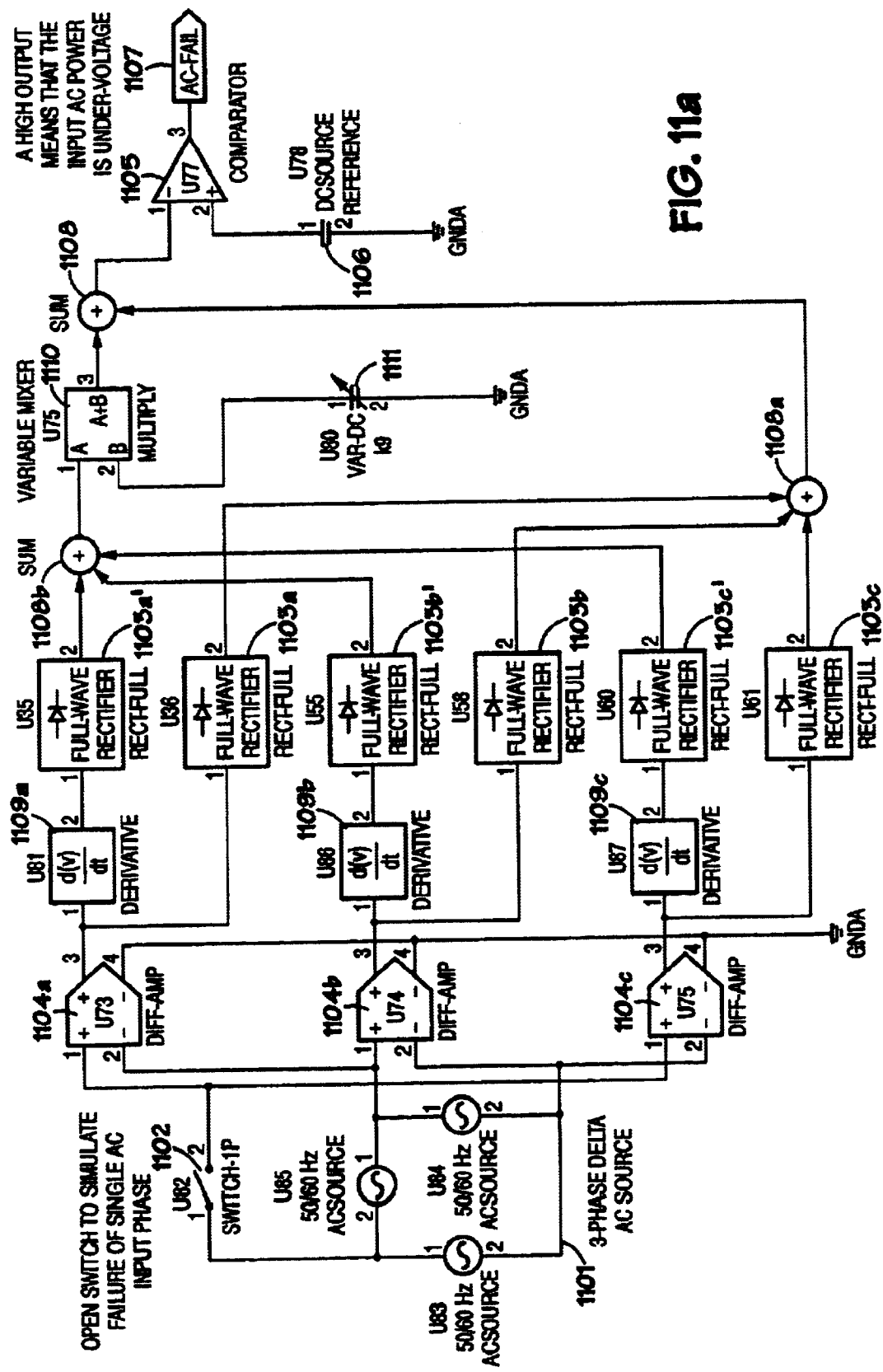
FIG. 11 is a three phase delta rectified then summed partial quadrature source failure detection circuit in accordance with the present invention.

The first such combination circuit is illustrated in FIG. 11. Each phase connection of three phase, delta connected source 1101 is connected to the input of one of differential amplifiers 1104, which isolate the individual phase voltages. The isolated phase voltages are input into full-wave rectifiers 1103. The full-wave rectified signals are summed by summing amplifier 1108a. The isolated voltages are fed in parallel into differentiator circuits 1109, and the output of the differentiator circuits are input into full-wave rectifiers 1103', and the rectified derivative signals are summed by summing amplifier 1108b. The summed rectified signals are added to the scaled sum of the rectified differentiator signals by summing amplifier 1108. Scaling is performed by variable mixer 1110, which operates in conjunction with variable DC source 1111. The summed signal output of summing amplifier 1108 is input into comparator 1105, which also receives an input from constant DC reference source 1106. If the output of summing amplifier 1108 is less than the reference source voltage, the comparator generates a logical high signal, indicating a failure of AC source 1101.

Figure 11B:
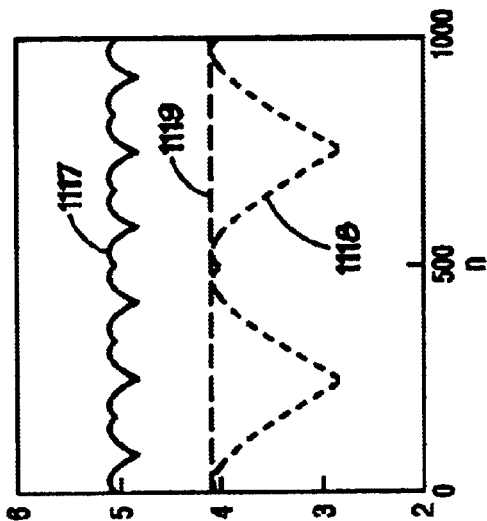

The circuit of FIG. 11 uses the method 3 discussed above but includes a fraction of the rectified quadrature signal derived in method 6 to make a compromise hybrid approach. The hybrid approach has lower delay times than method 3 but is less susceptible to noise than a full quadrature detection system. FIG. 11b illustrates the relevant waveforms generated by the circuit of FIG. 11 with the ratio of base signal to quadrature signal of 2.5 to 1. Waveform 1112 is the output of summing amplifier 1108 with all phases operational, while waveform 1114 is the output of summing amplifier 1108 with phase A failed by opening switch 1102. DC waveform 1113 is the DC value of reference 1106. When a failure of the source 1101 occurs, the worst case detection time will result if the failure occurs immediately when waveform 1114 rises above the detection threshold level, which occurs at point 1115. The failure will not be detected until sense waveform 1114 again drops below detection level 1113, which occurs at point 1116. The elapsed time between points 1115 and 1116 is 0.157 cycles, which is a significant improvement over the 0.237 cycles required by the non-quadrature method.

Figure 11C:
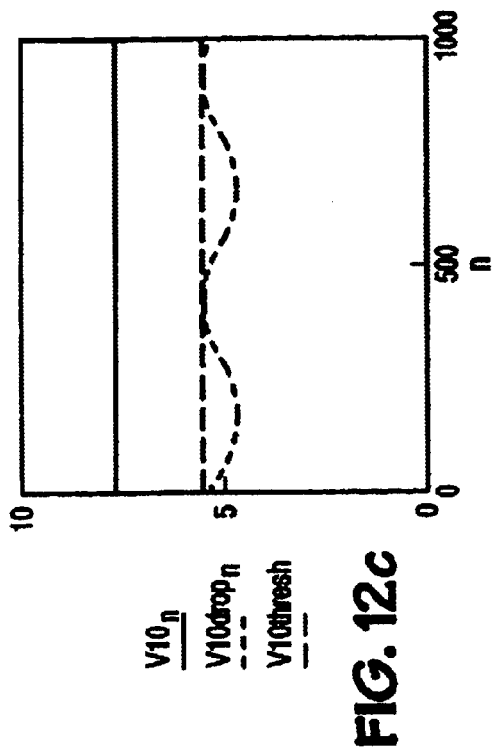

The ratio of quadrature signal to non-quadrature signal may be adjusted to change the worst case time interval required to detect a failure. The ratio may be optimized by iterative techniques, and it turns out that the optimum ratio is 0.522186. With this ratio of quadrature signal to normal signal, the relevant waveforms are illustrated in FIG. 11c. The normal signal with source 1101 operating properly is signal 1117. The detection threshold is signal 1119. Signal 1118 is the detection signal with one phase of source 1101 faulted by opening switch 1102. As can be clearly seen, the detection time should be zero, as the detection signal 1118 is below DC reference 1119 for all times when source 1101 is faulted.

Figure 12B:
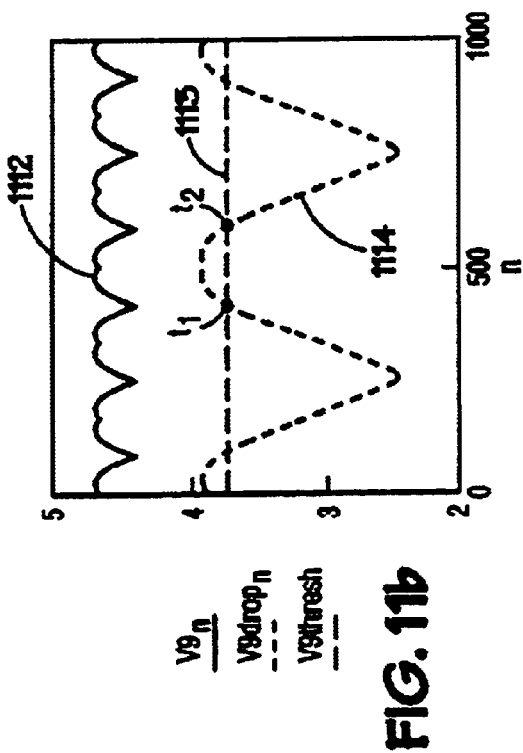
FIG. 12 is a three phase delta squared then summed partial quadrature source failure detection circuit in accordance with the present invention.

Another detection circuit is illustrated in FIG. 12. The circuit comprises three phase delta connected source 1201. Source 1201 is input into differential amplifiers 1204 to isolate the individual phase voltages. The isolated voltages are then input into squaring circuits 1203, and the squared signals are summed by summing amplifier 1208a. The isolated voltages are then parallel fed into differentiator circuits 1209, and the output of the differentiator circuits are input into squaring circuits 1203', and the squared derivative signals are summed by summing amplifier 1208b. The summed squared signals are added to the scaled sum of the squared differentiator signals by summing amplifier 1208. Scaling is performed by variable mixer 1210, which operates in conjunction with variable DC source 1211. The summed signal output of summing amplifier 1208 is input into comparator 1205, which also receives an input from constant DC reference source 1206. If the output of summing amplifier 1208 is less than the reference source voltage, the comparator generates a logical high signal, indicating a failure of AC source 1201.

Figure 12C:
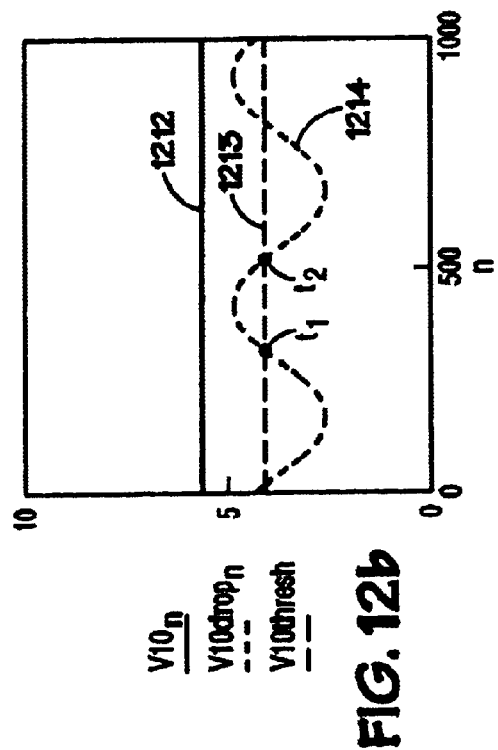
Figure 12A:
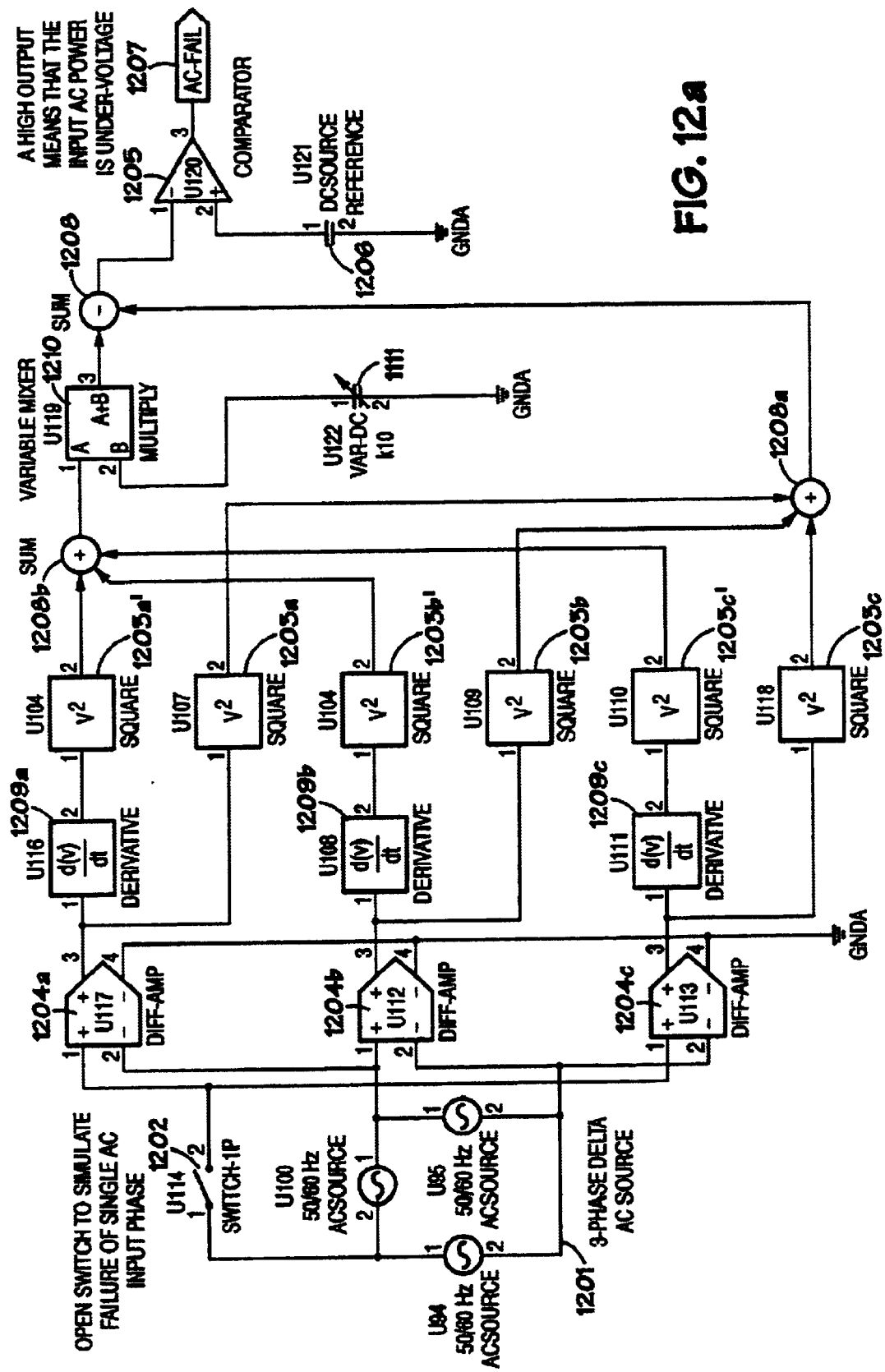

The circuit illustrated in FIG. 12 is similar to the circuit disclosed in FIG. 11 but operates by squaring the voltage signals rather than rectifying them. The relevant waveforms for the circuit of FIG. 12, with the ratio of quadrature signal to unshifted signal of 4 to 1, are illustrated in FIG. 12a. Signal 1212 is the output of summing amplifier 1208 with source 1201 normal. Signal 1213 is the detection threshold, which corresponds to the DC voltage of reference source 1206. Signal 1214 is the detection signal output of summing amplifier 1208 with one phase of source 1201 faulted by opening switch 1202. A failure will be detected when the value of signal 1214 is below reference voltage level 1213. The worst case detection time will occur when the failure occurs at point 1215, i.e., right after the level of signal 1214 has risen above the detection threshold. The failure will not be detected until the signal again drops below detection threshold 1213, i.e., at 1216. The time interval between these two may be calculated as 0.205 cycles.

The detection time may be adjusted by adjusting the ratio of quadrature signal to unshifted signal, which is accomplished by adjusting variable voltage DC source 1211. The optimum ratio of quadrature signal to unshifted signal may be determined mathematically as 0.713053, which results in zero detection time as illustrated in FIG. 12c.

FIG. 13 illustrates another circuit that may be used for three phase voltage failure detection. In the circuit of FIG. 13, both the three phase signals and the quadrature signals are full-wave rectified. The circuit comprises three phase delta connected source 1301, which inputs into differential amplifiers 1304a, 1304b and 1304c, which isolate the three individual phase voltages. The three individual phase voltages are input into three phase bridge rectifier 1303b, which outputs into differential amplifier 1304d, which generates a DC signal referenced to ground. The isolated three phase signals generated by differential amplifiers 1304a, 1304b and 1304c are also input into differentiation circuits 1309. The output of the differentiator circuits, i.e., the derivatives of the isolated signals are input into three phase bridge rectifier 1303a. The output of three phase rectifier 1303a is input into differential amplifier 1304c, which produces a signal referenced to ground. The now ground-referenced rectified derivative signal is passed through variable mixer circuit 1310 and into summing amplifier 1308, where it is added to the rectified full-wave three phase signal produced by differential amplifier 1304d. The ratio of rectified derivative signal to rectified signal is controlled by mixer 1310, which is controlled by the DC voltage of variable DC source 1311. The output of summing amplifier 1308 is then input into comparator 1305, which also receives an input from DC reference source 1306. If the output of summing amplifier 1308 is less than the value of DC reference source 1306, then the output 1307 of comparator 1305 goes high, indicating a failure of source 1301.

Figure 13A:
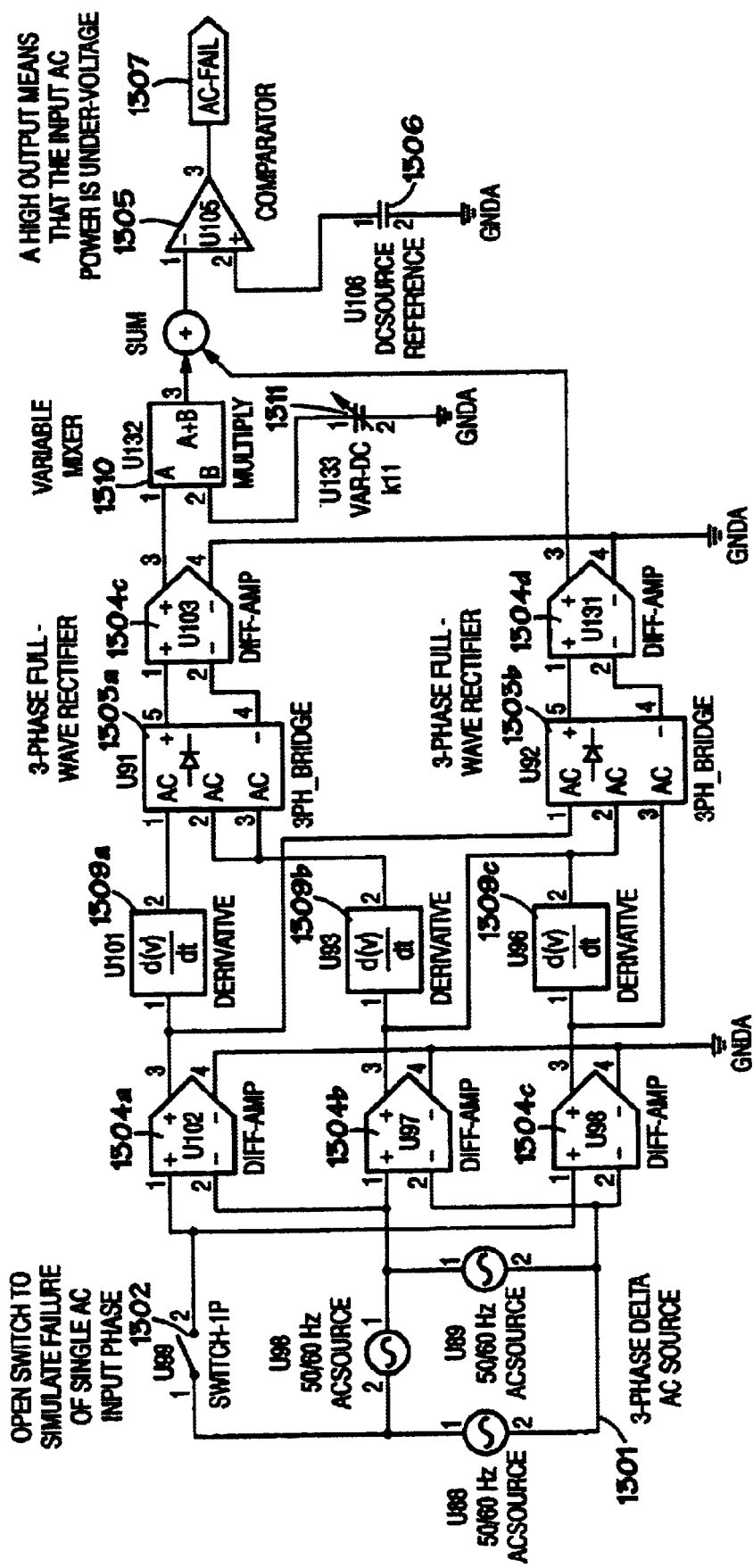
FIG. 13 is a three phase delta rectified partial quadrature source failure detection circuit in accordance with the present invention.
Figure 15B:
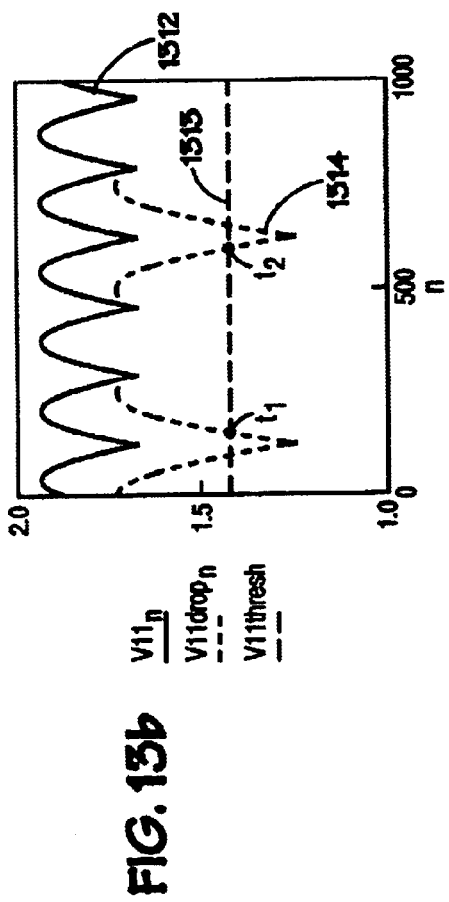

The relevant waveforms for the circuit illustrated in FIG. 13 are illustrated in FIG. 13a. Voltage signal 1312 is the output of summing amplifier 1308 with the ratio of quadrature signal to normal signal of 1 to 1. DC voltage signal 1313 is the voltage failure detection threshold level, which corresponds to the voltage of DC reference source 1306. Voltage signal 1314 is the output of summing amplifier 1308 when a failure of source 1301 is simulated by opening switch 1302. As discussed above, the worst case detection time will result when the failure occurs at the time when the detection signal rises above the level of the reference source, illustrated at point 1315. The failure will not be detected until the detection signal 1314 again drops below detection threshold 1313, which occurs at point 1316.

Figure 14:
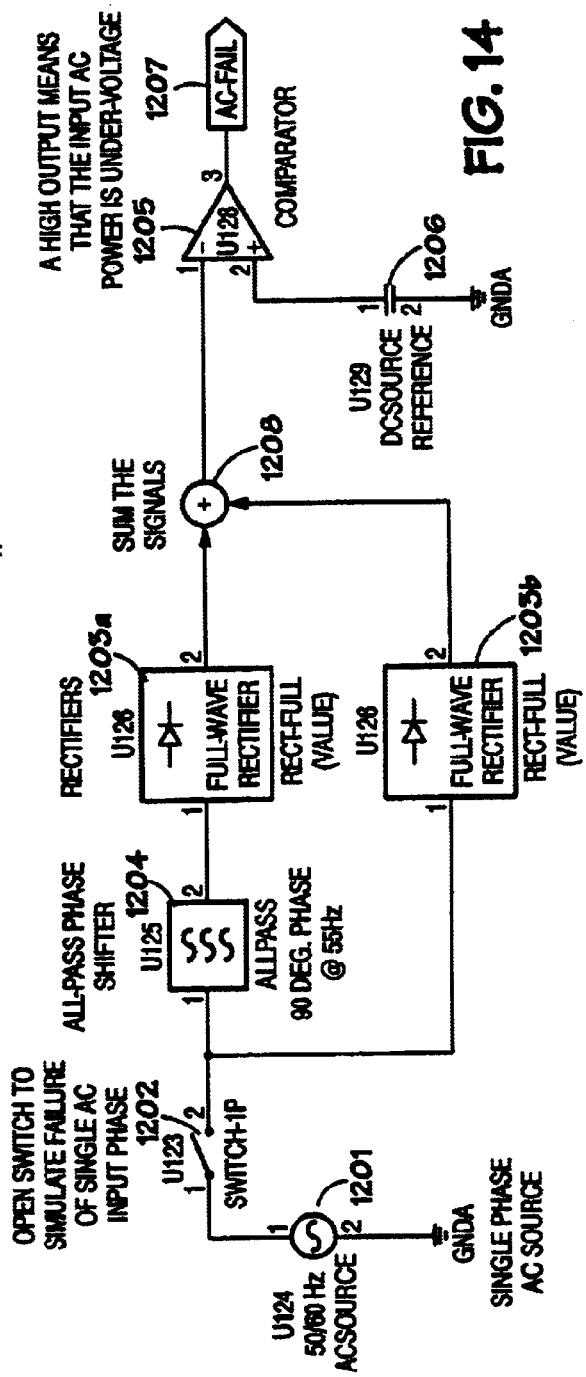
FIG. 14 is a single phase rectified then summed quadrature all pass derived source failure detection circuit in accordance with the present invention.

Another method compromises between delay time and noise rejection by using an all-pass filter to generate the quadrature signal instead of a differentiator (slope-detector) is illustrated in FIG. 14. The circuit comprises AC voltage source 1401, which inputs into full-wave rectifier 1403b. The rectified output is input into summing amplifier 1408. The voltage signal from source 1401 is also input into all-pass phase shifter 1404, which shifts the phase angle of the waveform by 90 degrees. The 90-degree shifted waveform is then input into full-wave rectifier 1403a. The rectified quadrature waveform is then input into summing amplifier 1408, where it is summed with the rectified line voltage. The summed signals are then input into comparator 1405, which has as an input DC reference source 1406. A line failure signal, i.e., a logical high, is generated at the output 1407 of comparator 1405 if the output of summing amplifier 1408 is less than the DC value of reference source 1406.

This circuit does not have the noise problem of the differentiator method since an all-pass filter has a flat frequency response. Operation of the circuit is complicated by the transient response of the all-pass filter. Unlike a low-pass filter, the all-pass filter responds instantaneously to a change on the input but the response is more complicated than a differentiator. The response to a step function in instantaneous but in the wrong direction; then over time it decays, crosses zero, and then ends up in the right direction. The result is that the delay is zero at either the peak or zero-crossing of the waveform and is worst case at a point half way between, at 135 degrees. But even at this point, the delay is only about 1.2 milliseconds for a circuit set up for 50 or 60 Hz.

It turns out by using empirical simulations that the all-pass is a better compromise between noise and speed than the differentiator followed by a low-pass filter. Also, a rectifying scheme works better than squaring with the all-pass approach.

In summary, the advantages of this method include: fast sensing time (0.066 cycles), good noise rejection, very simple and cheap circuit, no firmware or CPU required, and same circuit works at either 50 or 60 Hz without any modifications. The latter most feature is accomplished by actually designing it for 55 Hz, giving a negligible and equal error in the all-pass filter at either 50 or 60 Hz.

Additional modification and adaptations of the present invention will be obvious to one of ordinary skill in the art, and it is understood that the invention is not to be limited to the particular illustrative embodiments set forth herein. It is intended that the invention embrace all such modified forms as come within the scope of the following claims.

REFERENCES

The following references, to the extent that they provide exemplary procedural or other details supplementary to those set forth herein, are specifically incorporated herein by reference.

What is claimed is:

1. An automatic transfer switch for alternately connecting a load to a first power source or a second power source, the transfer switch comprising:

a main switch having two input terminals and an output terminal, the output terminal connected to the load;

a first switch interposed between a first input terminal of the main switch and the first power source;

a second switch interposed between a second input terminal of the main switch and the second power source; and a controller adapted to simultaneously open the first switch and switch the main switch from the first input terminal to the second input terminal and, upon expiration of a delay time, to close the second switch.

2. The transfer switch of claim 1 wherein the delay time is equal to ½ cycle of an AC voltage supplied by the first power source.

3. The transfer switch of claim 1 wherein the delay time is an interval required for arcing across the first switch to stop.

4. The transfer switch of claim 3 wherein the interval is determined by detecting a zero voltage across the first switch.

5. The transfer switch of claim 3 wherein the interval is determined by detecting a high voltage across the first switch.

6. The transfer switch of claim 3 wherein the interval is determined by detecting a zero current through the first switch.

7. The transfer switch of claim 1 wherein the delay time is the shorter of ½ cycle of an AC voltage supplied by the first power source or an interval required for arcing across the first switch to stop.

8. The transfer switch of claim 7 wherein the interval is determined by detecting a zero voltage across the first switch.

9. The transfer switch of claim 7 wherein the interval is determined by detecting a high voltage across the first switch.

10. The transfer switch of claim 7 wherein the interval is determined by detecting a zero current through the first switch.

11. A method for detecting failure of an AC signal source comprising:
   rectifying the AC signal;
   rectifying a quadrature signal of the AC signal;
   adding the rectified signal and the rectified quadrature signal;
   comparing the sum of the rectified signal and the rectified quadrature signal to a predetermined threshold voltage.

12. The method of claim 11, wherein the quadrature signal is obtained by differentiating the AC signal.

13. The method of claim 11 wherein the quadrature signal is obtained by passing the AC signal through an all-pass filter.

14. The method of claim 11 wherein the step of rectifying the AC signal is performed by squaring the AC signal, and the step of rectifying the quadrature signal is performed by squaring the quadrature signal.

15. A method of operating an automatic transfer switch having a main switch with an output terminal coupled to a load and two input terminals coupled via first and second cross-conduction prevention switches to first and second AC power sources, the method comprising:
   detecting failure of the first AC power source by:
      rectifying an AC signal generated by the first AC power source;
      rectifying a quadrature signal of the AC signal;
      adding the rectified signal and the rectified quadrature signal; and
      comparing the sum of the rectified signal and the rectified quadrature signal to a predetermined threshold voltage, whereby a failure is detected when the sum is less than the predetermined threshold voltage.
   upon detecting a failure of the first source, simultaneously switching the main switch from the first power source to the second power source while opening the first cross-conduction prevention switch; and
   upon expiration of a delay time, closing the second cross-conduction prevention switch.

16. The method of claim 15 wherein the delay time is equal to ½ cycle of an AC voltage supplied by the first power source.

17. The method of claim 15 wherein the delay time is an interval required for arcing across the first switch to stop.

18. The method of claim 15, wherein the quadrature signal is obtained by differentiating the AC signal.

19. The method of claim 15 wherein said quadrature signal is obtained by passing the AC signal through an all-pass filter.

20. The method of claim 15 wherein the step of rectifying the AC signal is performed by squaring the AC signal, and the step of rectifying the quadrature signal is performed by squaring the quadrature signal.

* * * * *